Dec. 25, 1928.
G. N. IRWIN
ANIMAL TRAP
Filed Feb. 21, 1928
1,696,768
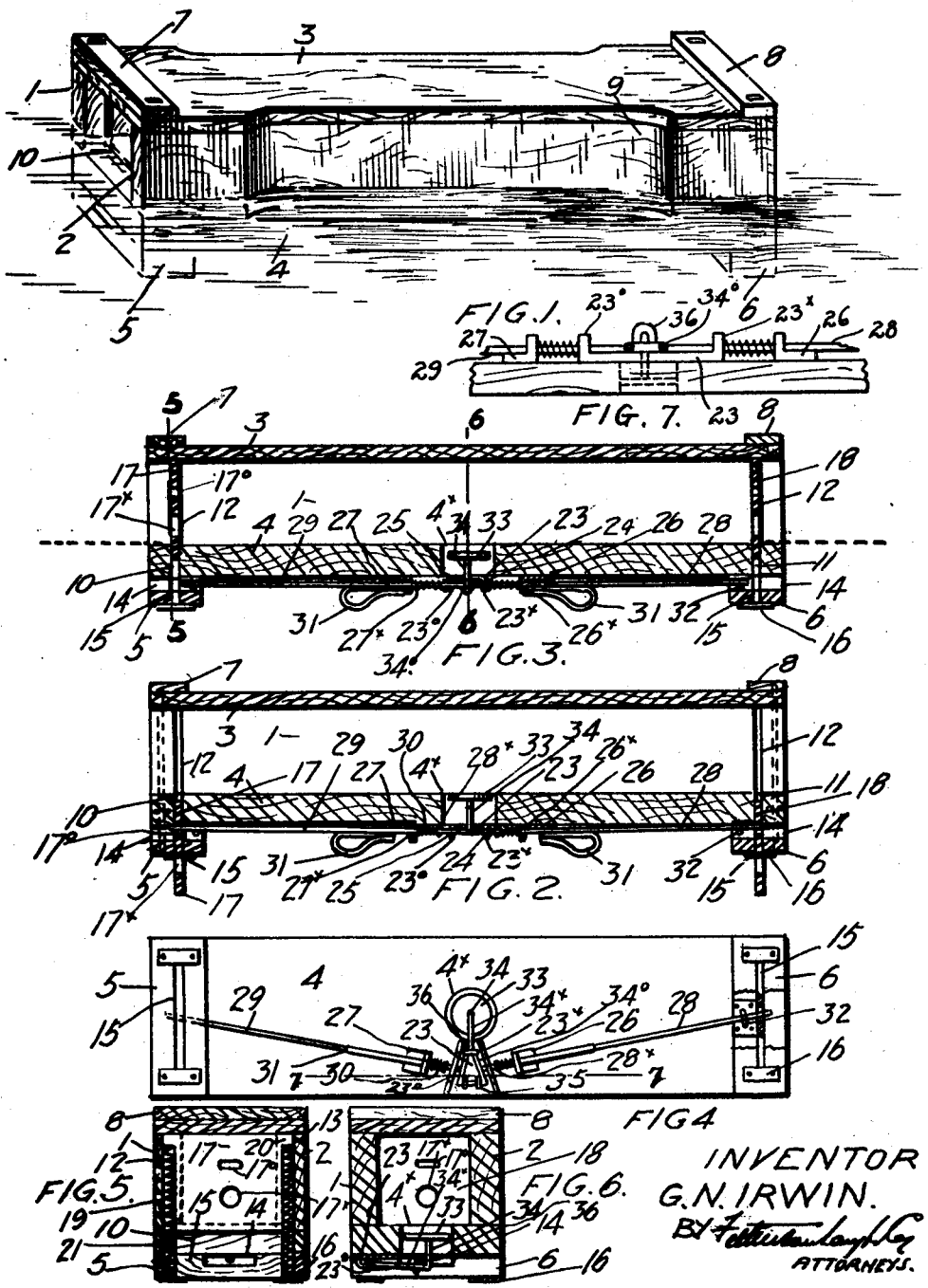
INVENTOR
G. N. IRWIN.
BY
ATTORNEYS.

Patented Dec. 25, 1928.

1,696,768

UNITED STATES PATENT OFFICE.

GEORGE NORMAN IRWIN, OF WHITBY, ONTARIO, CANADA.

ANIMAL TRAP.

Application filed February 21, 1928. Serial No. 255,990.

My invention relates to improvements in animal traps, and the object of the invention is to devise a trap which may be readily disguised and lie on the surface of the water, and therefore particularly adaptable for the efficient trapping of animals, such as muskrats, living in water areas so that they may be caught alive without injury to the pelt, and therefore of maximum market value and the animals can also be utilized for breeding stock, and it consists essentially of the arrangement and construction of parts as hereinafter more particularly explained.

Fig. 1 is a perspective view of my trap shown in operative position floating upon the surface of a sheet of water.

Fig. 2 is a longitudinal sectional view through Fig. 1 showing it in the set position.

Fig. 3 is a similar view to Fig. 2 showing it in the sprung position.

Fig. 4 is an inverted plan view of my trap showing the operating mechanism thereof.

Fig. 5 is a sectional view on line 5—5 Fig. 3.

Fig. 6 is a sectional view on line 6—6 Fig. 3.

Figure 7 is a sectional detail on line 7—7 Figure 4.

In the drawing like characters of reference indicate corresponding parts in each figure.

1 and 2 are side board members and 3 and 4 top and bottom board members, respectively, secured together to form a hollow open ended member. The member 4 is of relatively thick material to give the hollow body the desired buoyancy when placed in water so as to float upon the surface thereof.

5 and 6 are cross cleats extending across the bottom of the board 1 in proximity to each end thereof and 7 and 8 are cross cleats extending across the top board 3 in proximity to each end thereof. The top board 3 and side boards 1 and 2 are preferably hollowed out as indicated at 9 so as to lighten the upper structure and permit it to be more readily floated by the bottom board 4.

The bottom board 4 in proximity to the ends thereof is provided with cross slits 10 and 11 and the side boards 1 and 2 with vertical saw cuts 12 and 13 in align with the cross slits 10 and 11.

The cross cleats 5 and 6 are provided with recesses 14 and cross slits 15 in vertical alignment with the cross slits 10 and 11 of the board 4. The ends of the slits 15 are reinforced by metal plates 16.

17 and 18 are end closures for the trap which are preferably made of metal and slidable in their side edges within the vertical saw cuts 12. 19 are vertical bores extending through the side boards 1 and 2 with which the saw cuts 12 and 13 communicate. The closures 17 and 18 are provided with outwardly extending tongue portions 20 extending normally into the upper ends of the bores 19.

21 is a compression spring fitting within each bore and bearing at its upper end against the corresponding tongue 20. The bore 19 extends downward through the bottom board 4 and cross cleat 5, the cross slit 10 of the bottom board 4 and the cross slit 15 of the cleat 5 communicating at its end with the bore 19. The spring 21 therefore extends downward from the tongue 20 through the side board 1 or 2 and bottom board 4 and cross cleat 5 or 6 to bear at its lower end against the cross plate 16 which reinforces the ends of the slit 15.

The closure plate 17 is provided with an orifice $17^x$ and above the orifice with a slotted opening $17°$ for a purpose which will hereinafter appear.

$4^x$ is an orifice located in the centre of the bottom board 4.

23 is a bracket plate secured to the bottom of the board 4 adjacent the orifice $4^x$ in transverse position to the board. The bracket plate 23 is provided with up-turned sides $23^x$ and $23°$ having orifices 24 and 25. 26 and 27 are angle plates secured to the bottom of the board 4 at each side of the bracket plate 23 and provided with orifices $26^x$ and $27^x$. 28 and 29 are locking rods extending through the orifices 24 and 25 and $26^x$ and $27^x$ each provided with an enlargement $28^x$ between which and the corresponding brackets 26 and 27 extends a compression spring 30.

Each of the rods 28 and 29 is provided with a looped handle 31.

32 is a guiding eye in the form of a staple extending into the bottom board 4. 33 is a circular plate fitting freely within the orifice $4^x$. 34 is a stem extending downward from the plate and provided with an angular extension $34^x$ which is provided with a triangular portion $34°$, the transverse or base of which is pivotally mounted by the staples or eyes 35.

36 is a limiting staple to prevent the plate 33 dropping too far.

Having described the principal parts involved in my invention I will briefly describe the operation of the same.

The trap is set by drawing the end closures 17 and 18 downward from the position shown in Fig. 3 to the position shown in Fig. 2.

When in this position the slots 17° of the closure plates are brought into alignment with the ends of the locking rods 28 and 29, the springs 30 holding the rods in the withdrawn position. The rods 28 and 29 are then pulled longitudinally to pass through the slotted openings by means of the handles 31.

While performing this operation the trap is in an inverted position so that when the rods 28 and 29 are forced outward into the locking position the triangular portion 34° will drop between the inner ends of the rods 28 and 29 and hold them in their outward or set position. The trap is then carefully inverted and placed on the surface of the water as indicated in Figures 1, 2 and 3 so that it will be partially submerged, the water level being above the surface of the bottom board 4, and therefore above the level of the withdrawn closure plates 17 and 18. This is essential as all animals of this type can scent metal, and would be frightened away from any trap in which metal is exposed directly to the atmosphere.

When the animal enters the open end of the trap and passes into the centre thereof he treads upon the plate 33 depressing the same and carrying the triangular portion 34° out of engagement with the inner ends of the locking rods 28 and 29 permitting the springs 30 to operate to withdraw such locking rods to free the closures 17 and 18 which are then carried upward by the spring 21 to the closed position.

In order to guard against the animal gnawing through the boards of the trap the end closures are provided with orifices 17× which are above the water level and which will not only give the animal air but will at the same time attract its attention and it will attempt to pass its head through such hole instead of trying to find a way out by gnawing through the boards of which the trap is formed.

What I claim as my invention is:—

1. An animal trap comprising a hollow open ended member of buoyant material adapted to partially submerge and having vertical opposing guides in the inner face of the side walls adjacent to each end of the member, transverse slits in the bottom wall extending between the guides, a spring pressed closure plate slidably fitting within each pair of guides and withdrawable through the slit, and a tread plate located within the member, locking means for holding the closure plates in the withdrawn position, and means operated by pressure upon the tread plate for releasing such locking means.

2. An animal trap comprising a hollow open ended member of buoyant material adapted to partially submerge and having a cross slit in the bottom wall of such member in proximity to each end, a spring pressed closure plate withdrawable through said slit and adapted to close each open end and having an opening in the body of the plate in proximity to its upper edge, spring pressed locking rods carried upon the bottom of said hollow member adapted to pass through the openings of the plate to hold them in a withdrawn position, a depressible tread plate located within the member, and a locking piece adapted to be interposed between the inner ends of the rods to hold them in locked position and adapted to be moved from such interposed position by pressure from the tread plate.

GEORGE NORMAN IRWIN.